United States Patent [19]
Dillon

[11] Patent Number: 5,699,384
[45] Date of Patent: Dec. 16, 1997

[54] APPARATUS AND METHOD FOR SATELLITE RECEIVER COMPUTER ADAPTOR CARD

[75] Inventor: Douglas M. Dillon, Gaithersburg, Md.

[73] Assignee: Hughes Electronics, Los Angeles, Calif.

[21] Appl. No.: 745,191

[22] Filed: Nov. 7, 1996

Related U.S. Application Data

[63] Continuation of Ser. No. 340,347, Nov. 14, 1994, abandoned.

[51] Int. Cl.[6] .................................................. H04B 1/16
[52] U.S. Cl. ........................ 375/316; 455/161.3; 455/343
[58] Field of Search ........................ 375/316; 455/150.1, 455/161.2, 161.3, 343; 307/82; 363/131, 140

[56] References Cited

U.S. PATENT DOCUMENTS

| | | | |
|---|---|---|---|
| 4,135,156 | 1/1979 | Sanders, Jr. et al. | 370/104.1 |
| 4,538,073 | 8/1985 | Freige et al. | 307/82 |
| 4,599,647 | 7/1986 | George et al. | 380/10 |
| 4,636,879 | 1/1987 | Narita et al. | 360/72.2 |
| 4,680,688 | 7/1987 | Inou et al. | 363/131 |
| 4,777,657 | 10/1988 | Gillaspie | 375/316 |
| 4,876,737 | 10/1989 | Woodworth et al. | 455/12.1 |
| 4,959,872 | 9/1990 | Imai et al. | 455/164.1 |
| 5,019,910 | 5/1991 | Filmer | 348/552 |
| 5,038,265 | 8/1991 | Paladel | 307/82 |
| 5,058,138 | 10/1991 | Figura et al. | 375/316 |
| 5,077,834 | 12/1991 | Andros et al. | 455/193.1 |
| 5,111,504 | 5/1992 | Esserman et al. | 380/21 |
| 5,131,010 | 7/1992 | Derrenge et al. | 375/347 |
| 5,301,358 | 4/1994 | Gaskill et al. | 455/193.2 |
| 5,337,044 | 8/1994 | Folger et al. | 340/825.44 |
| 5,359,367 | 10/1994 | Stockill | 348/552 |
| 5,532,914 | 7/1996 | Kageyama et al. | 307/82 |
| 5,592,173 | 1/1997 | Lau et al. | 455/343 |

*Primary Examiner*—Stephen Chin
*Assistant Examiner*—Jeffrey W. Gluck
*Attorney, Agent, or Firm*—John T. Whelan; Wanda Denson-Low

[57] ABSTRACT

A printed circuit board intended to be placed within a card slot of a personal computer that allows the personal computer to receive information directly from a satellite communication network. The adaptor card operates in slave mode to a CPU of the personal computer. The CPU receives demodulated signals from a demodulator of the adaptor card via a bus interface on the adaptor card. The CPU also receives status information for the demodulator and a tuner and controls the operation of the demodulator and tuner via the bus interface. A DC-DC converter receives power from a power supply of the personal computer via the bus interface and provides power for the adaptor card circuitry. Moreover, the DC-DC converter powers a low noise block (LNB) of an antenna of the satellite communication network.

31 Claims, 8 Drawing Sheets

APPARATUS AND METHOD FOR SATELLITE RECEIVER COMPUTER ADAPTOR CARD

This application is a Continuation of application Ser. No. 08/340,347 filed on Nov. 14, 1994, now abandoned.

BACKGROUND OF THE INVENTION

This application relates to a computer network and, more specifically, to a method and apparatus for an adaptor card for a personal computer that receives information transmitted from a satellite.

In conventional satellite communication networks a hub station sends signals to a satellite and then to a receiver on the ground. The receiver includes an antenna. The antenna contains a low noise block (LNB) that amplifies and down converts an entire received transmission to L-band (typically 950 MHz to 1450 MHz) and passes the resulting signal into an interfacility link (IFL). The IFL is typically a coaxial cable that carries power to the LNB and carries the L-band signal to an Indoor Unit (IDU). The L-band coaxial cable is a standard interface in the satellite communications industry and is normally used regardless of the actual satellite transmission band (C-band, Ku-band, etc.).

The IDU is a separate unit that contains a power supply for the LNB and for the IDU. The IDU also contains a tuner, a demodulator, and a controller. The controller selects the tuner's frequency, the demodulator's bit rate, and performs various other functions needed for the operation of the receiver. The IDU tuner receives all of the signals from the satellite and selects a single signal for reception. The selected signal is passed to the demodulator. The IDU demodulator converts the analog signal from the tuner back into a digital data stream and passes it to an output line of the IDU.

The output line of the IDU is typically input to a serial adaptor card in a personal computer. The serial adaptor card allows the digital data stream to be processed by the computer and allows the computer to communicate with the controller to control the operation of the satellite receiver.

A disadvantage of such conventional systems lies in the fact that the IDU is a separate unit that is remote from the personal computer. Thus, the IDU, which is typically incorporated into the receiver unit, adds additional components to a satellite communication network. Such additional components increase the packaging requirements of the system. In addition, a separate cable is required to connect the IDU to the serial adaptor of the computer.

DISCLOSURE OF THE INVENTION

The present invention overcomes the problems and disadvantages of the prior art by placing a printed circuit board within a personal computer that allows the personal computer to receive information directly from a satellite without having to incorporate a separate unit between the personal computer and the receiving antenna for the demodulating and tuning functions. This information can include a digital video signal, a digital audio signal, a broadcast file transfer, or any other desired information transfer.

The present invention eliminates the need for a separate controller, such as the controller contained in a conventional IDU, because the personal computer can perform control functions. Furthermore, the reduction of circuitry achieved by applicant's invention increases the reliability of the system.

The present invention includes a DC-DC converter that transmits power from the power supply of the personal computer to the LNB of the antenna. Moreover, the circuitry of the applicants' personal computer adaptor card can be powered by the power supply of the personal computer.

In accordance with the purpose of the invention, as embodied and broadly described herein, the invention is an adaptor card in a personal computer having a CPU for connecting the personal computer to a satellite communication network, comprising: a connector for receiving a plurality of analog signals from the satellite communication network; a tuner, connected to the connector, that receives the plurality of analog signals from the connector and selects a single analog signal for reception; a demodulator, connected to the tuner, that converts the analog signal from the tuner into a digital data stream; and a bus interface, connected to the demodulator and the CPU, that allows the CPU to request the digital data stream from the demodulator.

In further accordance with the purpose of the invention, as embodied and broadly described herein, the invention is an adaptor card in a personal computer having a CPU for connecting the personal computer to a satellite communication network, comprising: a connector for receiver for receiving a plurality of analog signals from the satellite communication network; a tuner, connected to the connector, that receives the plurality of analog signals from the connector and selects a single analog signal for reception; a demodulator, connected to the tuner, that converts the analog signal from the tuner into a digital data stream; and a bus interface, connected to the tuner, the demodulator, and the CPU, that allows the CPU to send commands to the tuner and the demodulator to control operation of the tuner and the demodulator.

In further accordance with the purpose of the invention, as embodied and broadly described herein, the invention is an adaptor card in a personal computer having a CPU and a power supply for connecting the personal computer to a satellite communication network, comprising: a connector for receiver for receiving a plurality of analog signals from the satellite communication network; a tuner, connected to the connector, that receives the plurality of analog signals from the connector and selects a single analog signal for reception; a demodulator, connected to the tuner, that converts the analog signal from the tuner into a digital data stream; a DC-DC converter; a bus interface, connected to the demodulator, the tuner, the CPU, and the power supply that allows the CPU to send and receive data to and from the adaptor card and that allows voltage from the power supply to be sent to the DC-DC converter.

In further accordance with the purpose of the invention, as embodied and broadly described herein, the invention is a method for controlling an adaptor card in a personal computer having a CPU, for connecting the personal computer to a satellite communication network, comprising the steps of: receiving, by the adaptor card, a plurality of analog signals from the satellite communication network; selecting, by the adaptor card, a single analog signal for reception; converting, by the adaptor card, the analog signal into a digital data stream; receiving, by the CPU, the converted data from the adaptor card via a bus interface; receiving, by the CPU, status information from a tuner of the adaptor card and from a demodulator of the adaptor card via the bus interface; and sending, by the CPU, commands to the tuner of the adaptor card and to the demodulator of the adaptor card via the bus interface to control operation of the tuner and the demodulator in accordance with the status information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE DRAWINGS

Reference will now be made in detail to the preferred embodiments of the invention, examples of which are illustrated in the accompanying drawings. Wherever possible, the same reference numbers will be used throughout the drawings to refer to the same or like parts.

Figure 1:
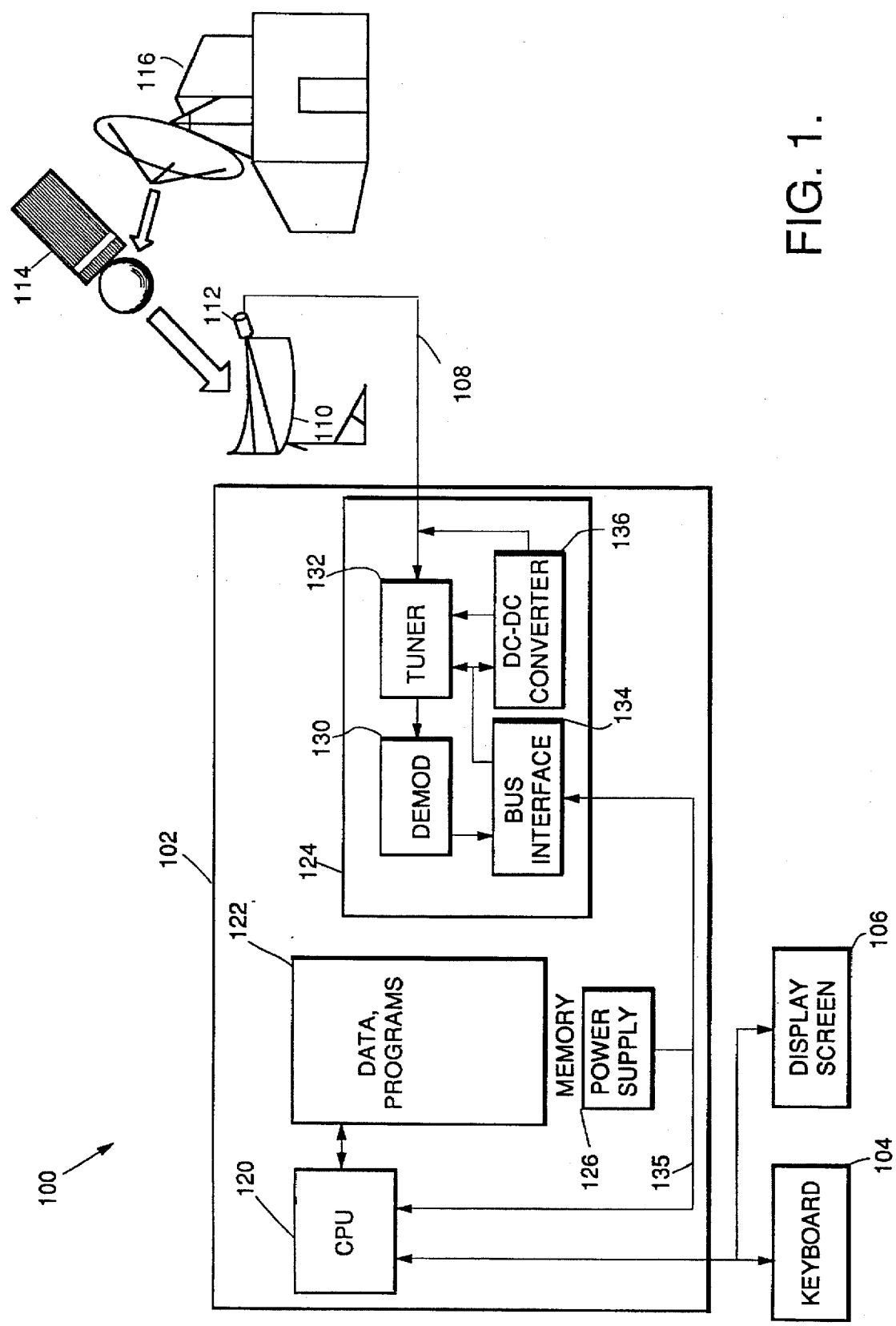
FIG. 1 is a hardware block diagram of a preferred embodiment of the invention.

FIG. 1 is a hardware block diagram 100 of a preferred embodiment of the invention connected to a satellite communications network. FIG. 1 includes a personal computer 102, a keyboard 104, a display screen 106, an IFL link 108, an antenna 110, an LNB 112, a satellite 114, and a hub 116. Personal computer 102 includes a CPU 120, a memory 122, a satellite receiver computer adaptor card 124, a bus 135, and a power supply 126. The personal computer also includes one or more expansion slots (not shown) into which an adaptor card such as the adaptor card 124 can be plugged. Adaptor card 124 includes a demodulator 130, a tuner 132, a bus interface 134, and a DC-DC converter 136.

IFL 108, antenna 110, LNB 112, satellite 114, and hub 116 are all of a known type. Hub 116 preferably sends a signal in a Ku-band having approximately a 500 MHz frequency range to satellite 114. The signal preferably is encoded using binary phase shift keying (BPSK) but could be encoded using other methods. Satellite 114 transmits the signals to a receiver including antenna 110. The signal from the hub can be any desired signal such as a digital video signal, e.g., MPEG-1 or INDEO 3.2, a digital audio signal, e.g., ADPCM, or a broadcast file transfer. Antenna 110 contains a low noise block (LNB) 112 that amplifies and down converts an entire received transmission preferably to L-band (typically 950 MHz to 1450 MHz) and passes the resulting signal into an interfacility link (IFL) 108. IFL 108 is preferably a coaxial cable that carries power from the DC-DC convertor 136 to LNB 112 and data from LNB 112 to tuner 132.

Adaptor card 124 is connected to CPU 120 via bus 135. Bus 135 is connected to adaptor card 124 via bus interface 134. Bus 135 can be, e.g., an ISA, EISA, or Microchannel bus, or any .other bus well known in the art. Bus interface 134 is a suitable bus interface of a type corresponding to a type of bus 135. Bus 135 and bus interface 134 also can be other types of busses or bus interfaces suitable for use with the present invention.

Memory 122 includes data and software programs. CPU 120 executes the instructions of the software programs to perform the steps in a conventional manner. CPU 120 preferably is a 33 MHz or faster Intel 486 microprocessor belonging to the X86 family of microprocessors, manufactured by Intel Corp., but may be any similarly capable CPU depending upon the nature of the personal computer.

Adaptor card 124 preferably is a single printed circuit board that fits into a card slot in personal computer 120. Within adaptor card 124 tuner 132 receives the plurality of analog signals via IFL 108. Tuner 132 selects one of the analog signals in accordance with a tuning frequency previously sent to tuner 132 by CPU 120. Tuner 132 passes the selected signal to demodulator 130, where it is demodulated and passed to CPU 120 of computer 102 via bus interface 134. As will be described below, CPU 120 controls tuner 132 by passing control data to tuner 132 via bus interface 134. The adaptor card 124, including the connector, the tuner 132, the demodulator 130 and the bus interface 134, is powered by power supply 126. Power supply 126 also powers all components in computer 102 and LNB 112.

DC-DC converter 136 receives power from the power supply 126 of personal computer 102 via bus interface 134, converts the voltage to the voltages required by the tuner 132 and the LNB 112, and sends a voltage signal to tuner 132. The voltage signal is also sent from DC-DC converter 136 to LNB 112 via IFL 108.

Figure 2:
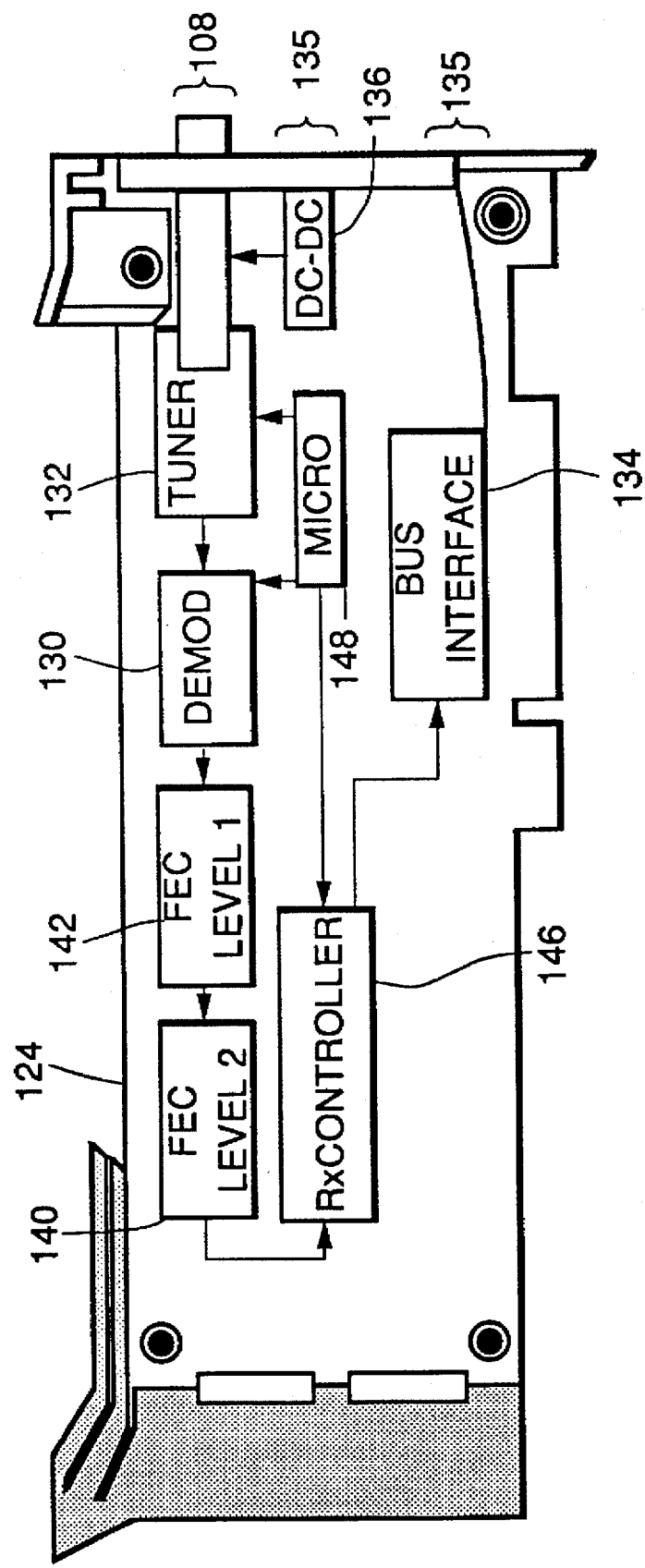
FIG. 2 is a diagram showing additional detail of a satellite receiver computer adaptor card of FIG. 1.

FIG. 2 is a diagram showing additional detail of the preferred embodiment of adaptor card 124. Adaptor card 124 also preferably includes a Forward Error Correction (FEC) Level 2 element 140 and an FEC Level 1 element 142, bus interface 134, a receiver (Rx) controller 146, and a microprocessor 148. FEC elements 140 and 142 and microprocessor 148 are optional and may be omitted in certain implementations of the invention.

Rx controller 146 provides a packet framing function, address filtering, which allows simultaneous reception of approximately 100 addresses and Data Encryption Standard (DES) decryption. Additional details of adaptor card 124 of FIG. 2 are discussed below in connection with FIG. 3.

Figure 3:
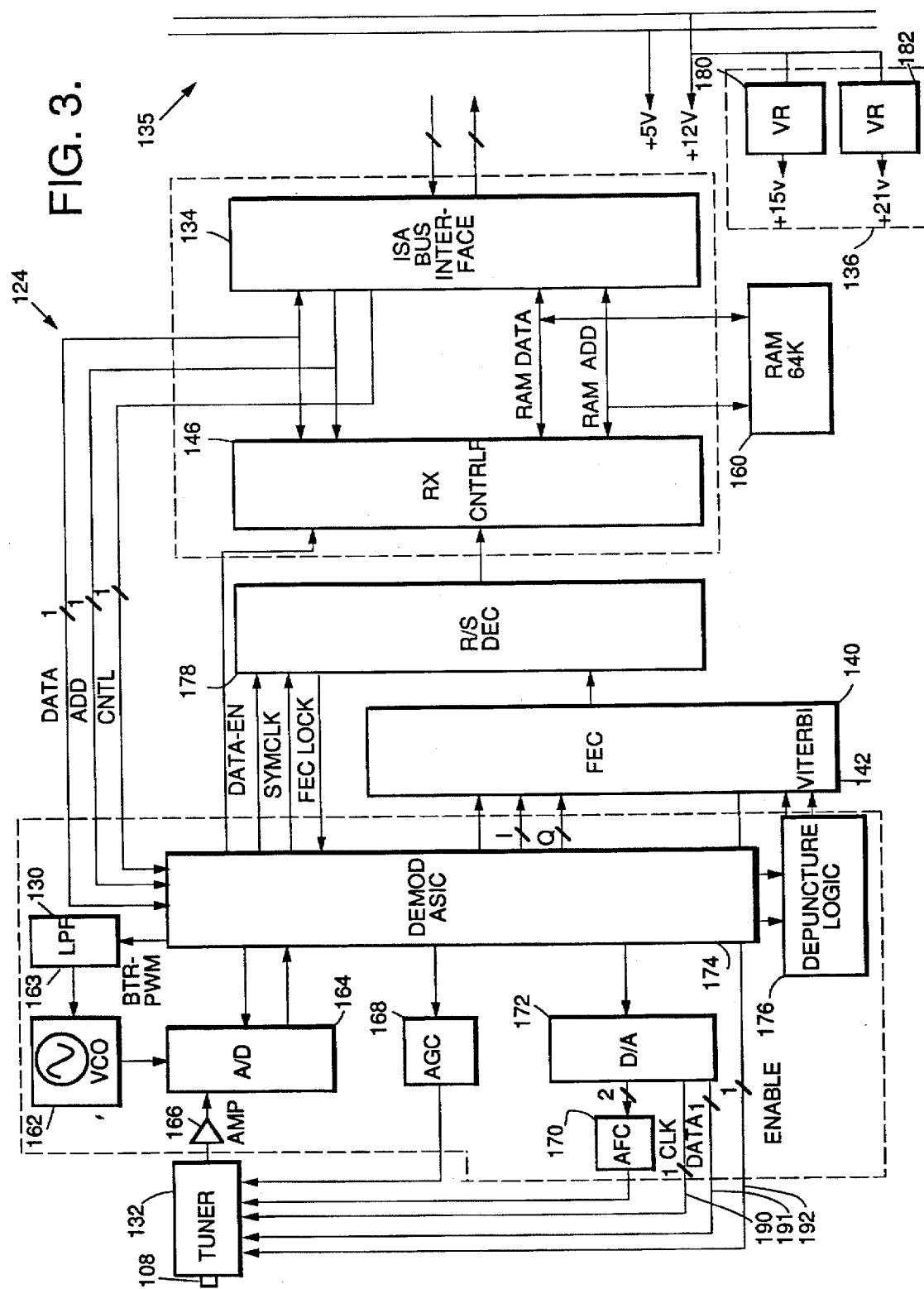
FIG. 3 is a block diagram showing additional detail of the satellite receiver computer adaptor card of FIG. 2.

FIG. 3 is a block diagram showing additional details of adaptor card 124. Microprocessor 148 is omitted from the embodiment of FIG. 3. In FIG. 3, the received signal is received at tuner 132 via IFL 108 and is passed to demodulator 130 for demodulation. The data is forward error corrected in FEC elements 140 and 142 and is passed to the CPU 120, show in FIG. 1, via bus interface 134. In FIG. 3, bus 135 is preferably an ISA bus, although bus 135 may be any suitable bus. The ISA implementation of adaptor card 124 shown in FIG. 3 preferably operates in "slave mode." That is, received data is buffered in a 64 K RAM 160 until CPU 120, shown in FIG. 1, sends a request for data to adaptor card 124 via bus 135. In implementations using a Microchannel bus, RAM 160 is replaced by a 64 K byte FIFO buffer. Received data preferably is modulated using a BPSK format.

Tuner 132 preferably is a known tuner of a type manufactured by Sharp or Panasonic. Demodulator 130 can be any known type of demodulator. Preferably, demodulator 130 is a demodulator of a type found in the DIRECT TV® product, of a type found in the RCA DSS® satellite receiver sold by Thomson Consumer Electronics, Inc. DIRECT TV® and DSS® are registered trademarks of DIRECTTV, Inc. a unit of Hughes Electronics Corporation). Demodulator 130 includes a voltage controlled oscillator (VCO) 162, a low pass filter (LPF) 163, an A/D converter 164, an amplifier 166, an automatic gain control (AGC) element 168, an automatic frequency control (AFC) element 170, a D/A converter 172, an application specific integrated circuit (ASIC) 174, and a depuncture logic element 176.

FEC elements 140 and 142 function to correct bit errors using a known method. For example, FEC may be implemented via Stanford Telecom (STEL) or HNS Viterbi decoding. In the preferred embodiment, a Reed-Solomon decoder 178 corrects multi-bit errors. Both the FEC elements and Reed-Solomon decoder 178 are optional and may be deleted from some implementations of the present invention.

Rx controller 146 of FIG. 3 performs frame detection on the received, demodulated, error-corrected signal. Frame detection includes functions such as address recognition, CRC checking, maximum frame length checking, and frame error detection.

Rx Controller 146 additionally performs DES decryption in implementations of the invention where the incoming signal is encrypted. In still other implementations, Rx controller 146 performs address filtration so that only data of interest will be passed to CPU 120, as shown in FIG. 1. Other implementations of the invention use a known high-level data link control (HDLC) element in place of Rx controller 146, such as the Z85C30 HDLC manufactured by Advanced Micro Devices.

DC-DC converter 136 includes two voltage regulator (VR) elements 180 and 182. DC-DC converter 136 preferably receives a 5 V signal from the power supply 126, shown in FIG. 1, supplied by bus 135 via bus interface 134 and outputs a 15 V and a 21 V signal, although it may instead receive a 12 V signal from the power supply 126 for conversion. The 15 V signal and the 21 V signal both are input to tuner 132. In a preferred embodiment, the 21 V signal is passed from tuner 132 to LNB 112 to provide power to LNB 112. The LNB requires a 15 V signal, but the tuner sends a 21 V signal to account for losses in the IFL 108.

Figure 4:
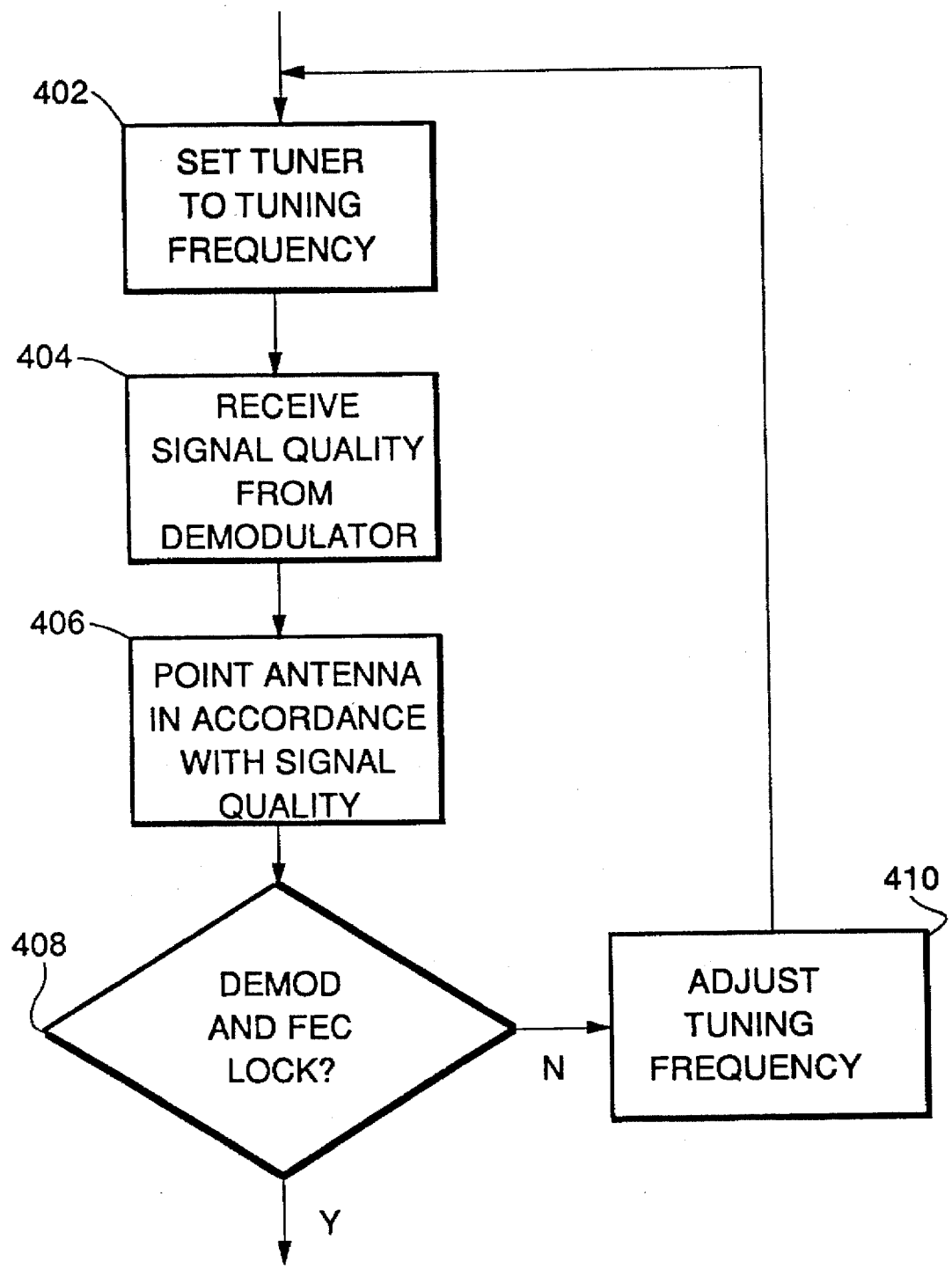
FIG. 4 is a diagram of steps performed by a CPU of FIG. 1.
Figure 5A:
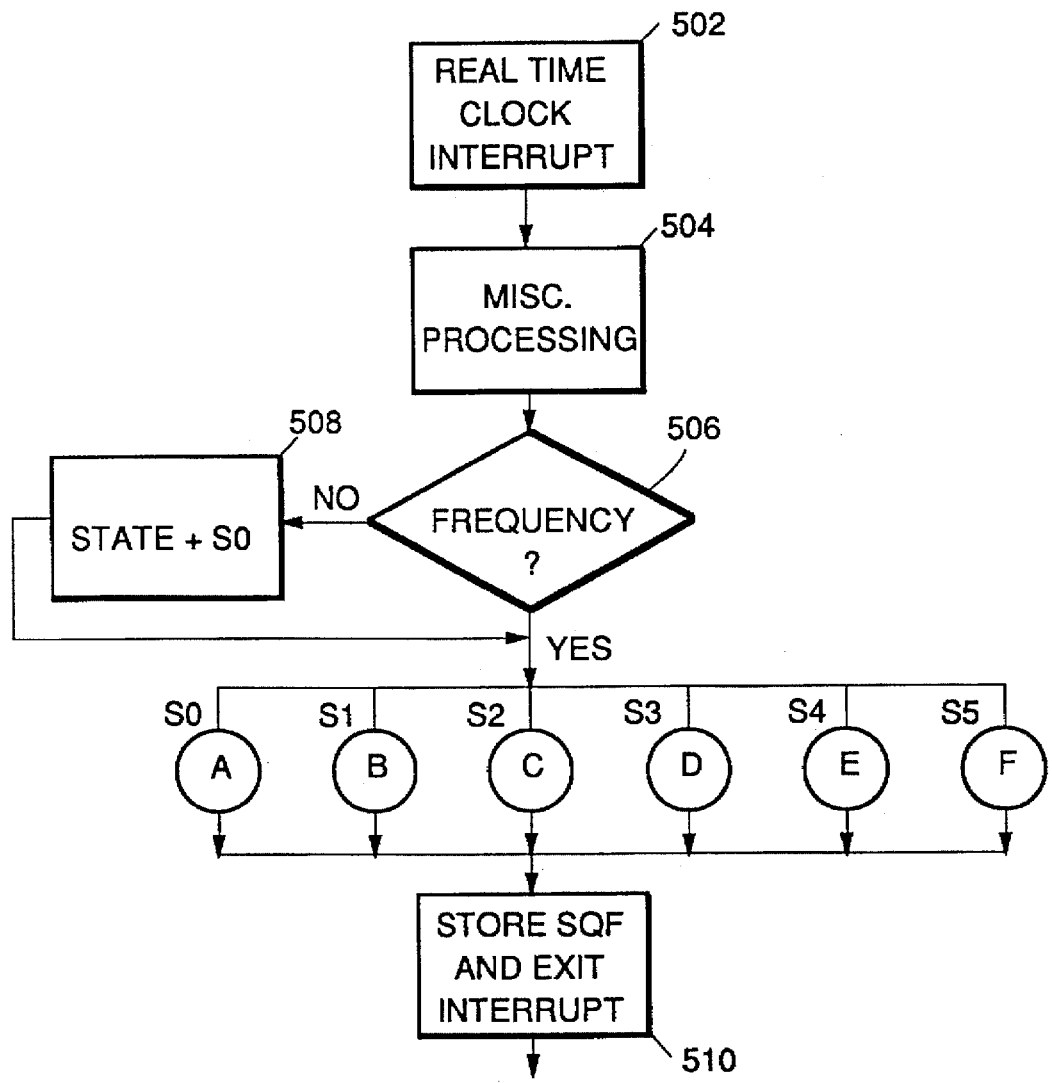
FIGS. 5(a) through. 5(f) are detailed diagrams of steps performed by the CPU of FIG. 1 during tuning and demodulation.
Figure 5B:
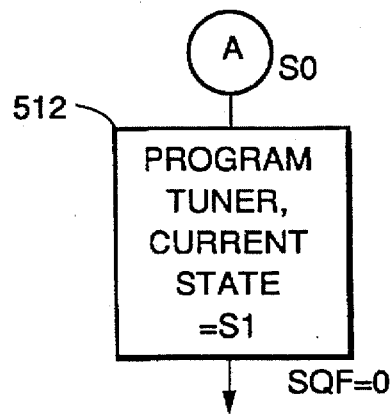
Figure 5C:
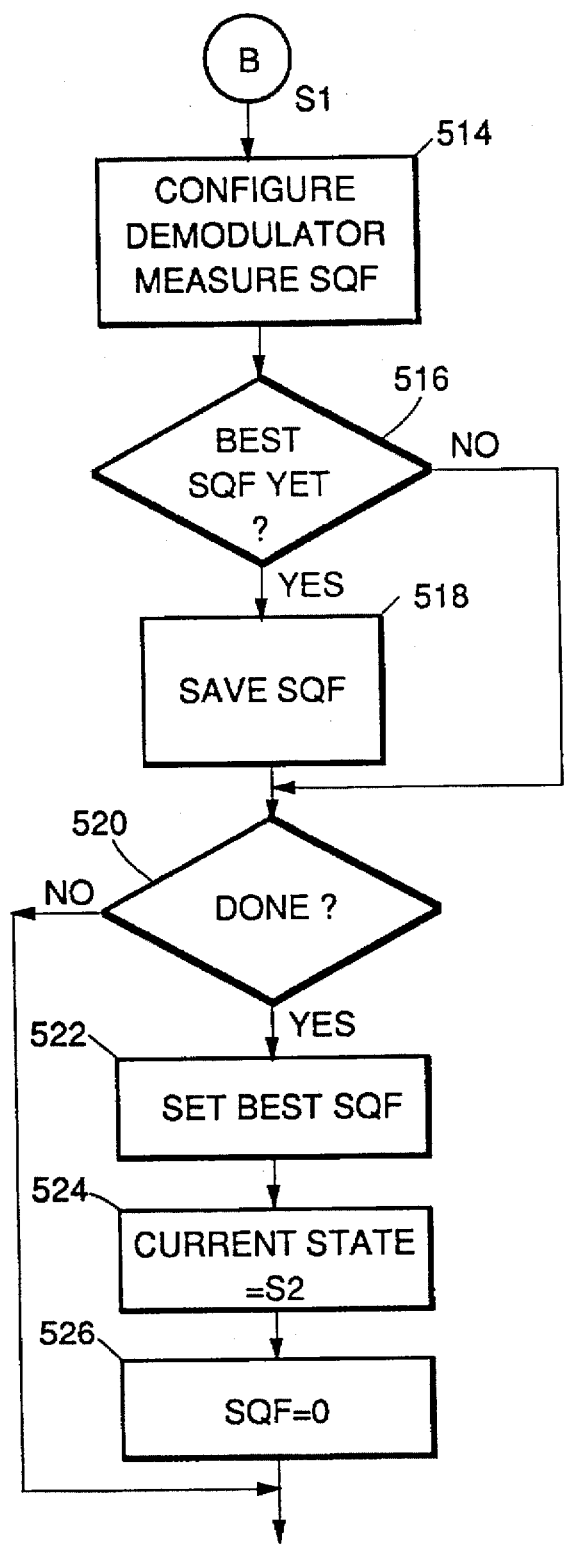
Figure 5D:
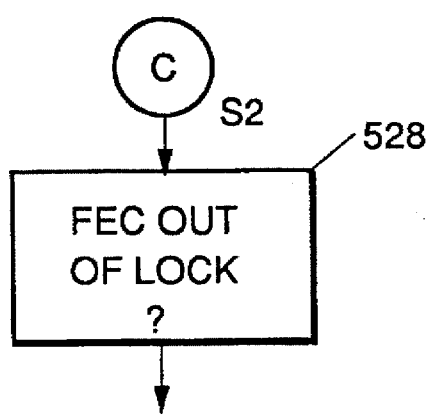
Figure 5E:
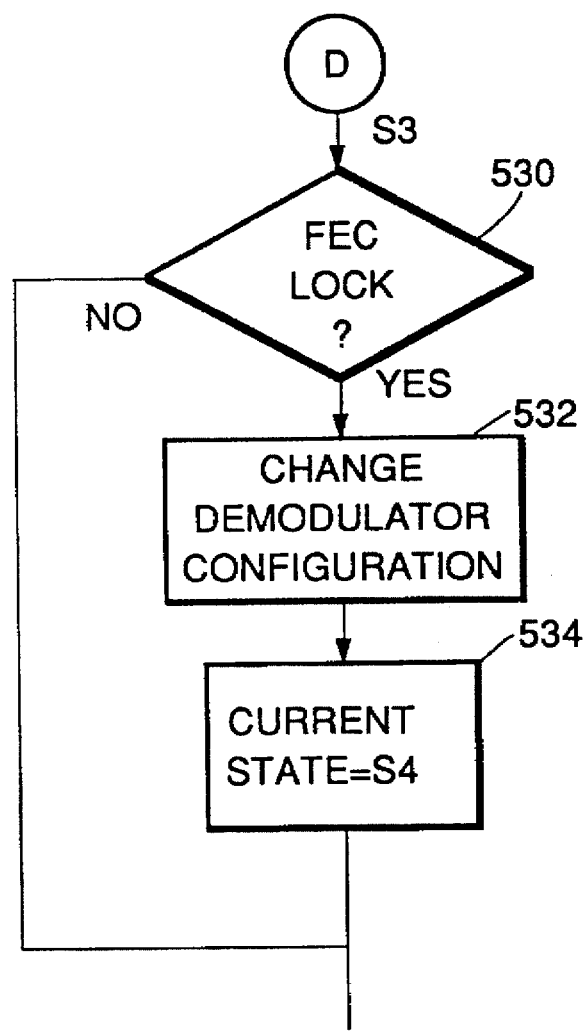
Figure 5F:
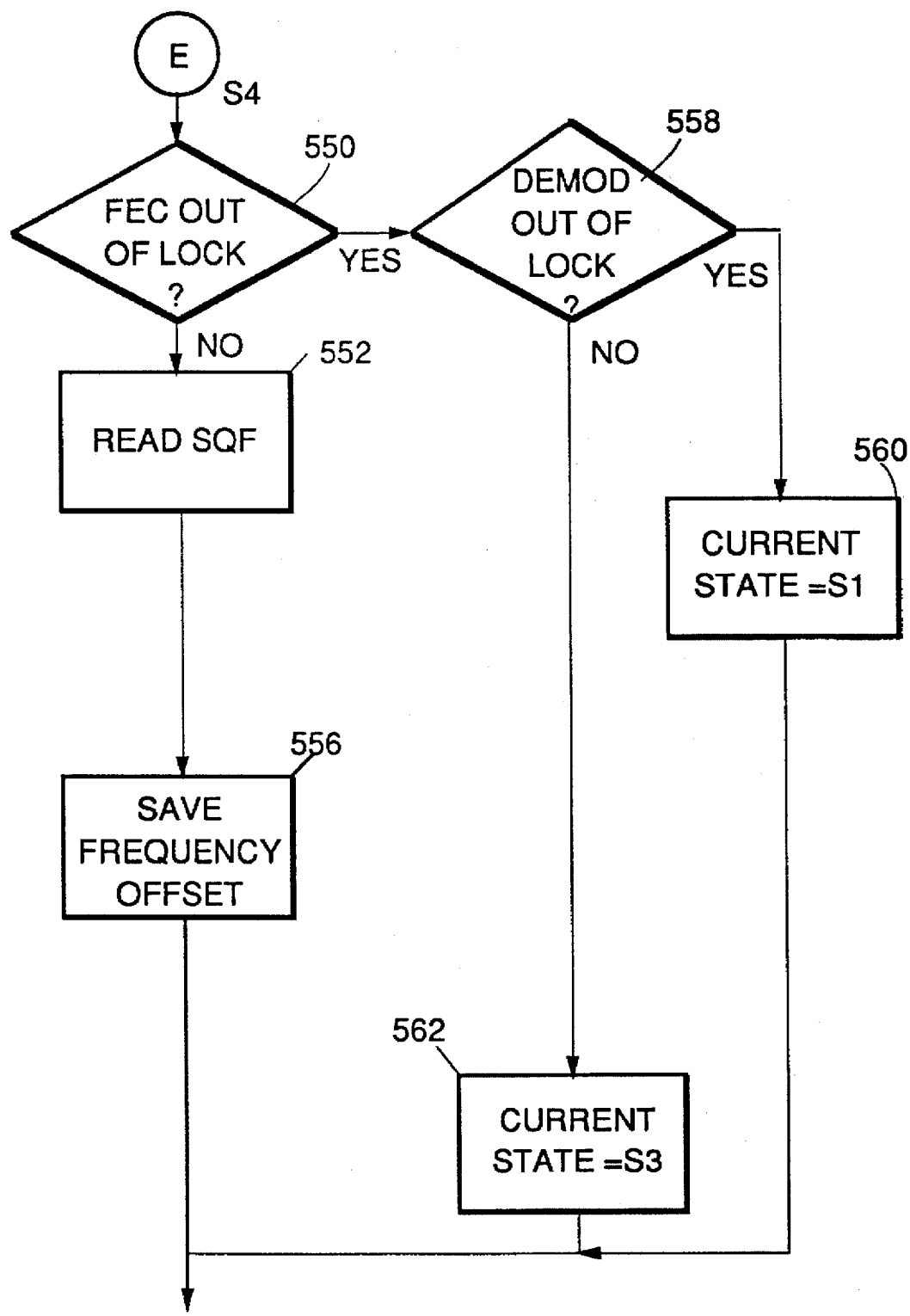

FIG. 4 is a diagram of steps performed by CPU 120, as shown in FIG. 1. In addition to the steps shown in FIG. 4, CPU 120 performs the functions normally performed by a CPU of a personal computer. CPU 120 also processes the packets received by adaptor card 124. As shown in FIG. 4, and referring back to FIG. 1, in step 402 CPU 120 sends signals to tuner 132 via bus 135 and bus interface 134. In the described embodiment shown in FIG. 3, signals pass to tuner 132 through demodulator ASIC 174. Thus, when a person indicates a tuning frequency via, e.g., keyboard 104 or a touch display in display screen 106, CPU sends data that is passed to tuner 132 on data line 191. Specifically, CPU 120 sends a one-bit enable signal to tuner 132 on line 192. Then, approximately every 18 msec (in response to a real time interrupt signal) CPU 120 toggles clock line 190 and sends one bit of the tuning frequency to tuner 132. Clock line 190 is toggled and a bit sent every 18 msec until the tuning frequency has been sent. In one implementation, a graphical user interface (GUI) makes it easy for a person to enter a tuning frequency. In other implementations CPU 120 plays a sound over a speaker (not shown) when the demodulator and FEC element are locked. In still other implementations, CPU 120 may determine a tuning frequency without human intervention.

In step 404, CPU 120 checks the quality of the signal received from demodulator 130. Signal quality is preferably measured by Signal Quality Factor (SQF) and Energy Per Bit to Noise Ratio (EBNR). These details are determined by the adaptor card hardware and software and the operating system of the operating computer. In step 406 CPU 120 sends a signal to point the antenna in accordance with the quality of the received signal. In step 408, if demodulator 130 and FEC 140/142 are not locked, the tuning frequency is adjusted in step 410 as described below and steps 402 through 408 are repeated.

In the preferred embodiment, the tuner 132 is able to tune within plus or minus 2 MHz of the correct signal frequency. In order to begin receiving, i.e., to acquire or lock the signal, the adaptor card 124 must search through this 4 MHz range.

FIGS. 5(a) through 5(g) are diagrams of steps performed by CPU 120, as shown in FIG. 1 for tuner and demodulator control. In the described embodiment, a real time clock interrupt occurs every 18 msec. When an interrupt occurs in step 502, CPU 120 performs miscellaneous processing in step 504. If no tuning frequency has been indicated in step 506, then a tuning frequency is acquired from an operator and an initial state is set to S0 in step 508. Next, control branches depending on a current control state. All branches return to step 510, where a current SQF value is stored in a memory of computer 102.

State S0 is an initial state for channel acquisition. If the current state is S0, i.e., if tuner 132 has not been set, then control passes to step 512 of FIG. 5(b). In step 512, CPU 120 programs tuner 132 as described above and sets a current state to S1.

If the current state is S1, CPU 120 configures demodulator 130 at the tuning frequency by sending data, address, and control signals to demodulator 130. Demodulator 130 preferably sweeps in 100 KHz steps for 20 msec in a 4 MHz band. At the end of the sweep, demodulator 130 has determined an SQF value. If the SQF is the best SQF yet, i.e., if it is the highest numerical value, it is saved in step 518. If CPU 120 determines that it is through sweeping through the 4 MHz, then the CPU 120 proceeds immediately to step 510 to store the SQF value and exit the interrupt. If the CPU 120 determines that the sweep through the 4 MHz is not complete, then the CPU 120, in step 522, saves the best SQF found as yet. In step 524 the current state is set to S2 and in step 526 the SQF register in demodulator 130 is cleared.

When the current state is S2, the CPU 120 sends a command to the demodulator 130 to enable the bit timing recover (BTR) loop. The BTR allows the demodulator 130 to determine where each bit begins and ends and so to correctly sample and demodulate the bits. The command is sent over the data, address, and control lines. After the BTR is enabled, the current state is set to S3.

When the current state is S3, if the FEC lock signal from the Reed-Solomon decoder 178 is low in step 530, indicating that the FEC is in lock, i.e., the Reed-Solomon decoder 178 has detected too many errors in transmission from the satellite, CPU 120 in step 532 changes the configuration of demodulator 130. Some factors changed include the length of the frequency sweep, the range of the sweep, and how often sampling is done. The current state is then set to S5 in step 543. If the FEC signal was high in step 530, indicating that there were not too many errors in transmission from the satellite, then control passes immediately to step 510 to store the SQF value and exit the interrupt.

When the current state is S4, the CPU 120 determines if the FEC is in lock and if the demodulator is out of lock. In the preferred embodiment, the CPU 120 determines if the FEC is in lock by reading the FEC lock signal from a register (not shown) in the demodulator ASIC 174 and determining if the FEC lock signal is high, i.e., not locked. This occurs if the Reed-Solomon decoder 178 has detected a large number of errors. The FEC lock signal in the register parallels the FEC lock signal being high if the FEC lock signal is high and being low if the FEC lock signal is low. In the preferred embodiment, the CPU 120 determines if the demodulator 174 is out of lock by reading information from a register in the demodulator indicating whether the modulator is out of lock.

If the FEC is not locked in step 550, i.e., few or no errors are detected by the Reed-Solomon decoder 178, the CPU 120 reads the SQF in step 552 and saves the frequency offset in step 556. If the FEC is locked the CPU 120 determines if the demodulator 74 is out of lock in step 558. If the demodulator is out of lock, the current state is set to S1. If the demodulator is not out of lock, the current state is set to S3.

In summary, the present invention allows a personal computer to be connected to a satellite communication network by merely adding an adaptor card to the personal computer and by loading control software into the personal computer. The CPU of the personal computer provides a control function for the adaptor card, and the power supply of the computer powers both the adaptor card and an LNB element connected to the computer. The adaptor card accesses the satellite communication network through a standard IFL. In addition, the reduction of circuitry achieved by applicant's invention increases the reliability of the system.

Other embodiments will be apparent to those skilled in the art from consideration of the specification and practice of the invention disclosed herein. It is intended that the specification and examples be considered as exemplary only, with a true scope of the invention being indicated by the following claims.

I claim:

1. An adaptor card for use in a personal computer, for enabling the personal computer to receive a signal from a satellite communication network, comprising:

a connector for receiving a plurality of signals from the satellite communication network;

a tuner, connected to the connector, that receives the plurality of signals from the connector and selects a single signal for reception;

a demodulator, connected to the tuner, that converts the selected signal from the tuner into a digital data stream;

a bus interface, connecting the adaptor card and the personal computer, that allows the digital data stream, a demodulator status and a tuner status to be transmitted from the adaptor card to the personal computer; and a DC-DC converter for receiving a voltage signal from a power supply of the personal computer and converting the voltage signal into a plurality of voltage signals for providing power to the tuner.

2. The adaptor card of claim 1, wherein the bus interface allows the personal computer to send commands to the tuner and to the demodulator, to control operation of the tuner and the demodulator.

3. The adaptor card of claim 1, wherein the bus interface is an ISA bus interface.

4. The adaptor card of claim 1, wherein the bus interface is a Microchannel bus interface.

5. The adaptor card of claim 1, wherein the bus interface is an EISA bus interface.

6. The adaptor card of claim 1, wherein the bus interface is an PCI bus interface.

7. The adaptor card of claim 1, further comprising at least one forward error correction element for performing a forward error correction on the digital data stream.

8. The adaptor card of claim 1, further including means for performing packet framing on the demodulated signal.

9. The adaptor card of claim 1, further including means for performing address filtering to receive only predetermined addresses.

10. The adaptor card of claim 1, further including means for performing decryption on the received signal.

11. The adaptor card of claim 1, wherein the adaptor card is powered by a power supply of the personal computer.

12. The adaptor card of claim 1, further comprising a DC-DC converter connected to a power supply of the personal computer to provide power for an LNB element of the satellite communication network.

13. The adaptor card of claim 12, wherein the satellite communication network includes an interfacility link and wherein the power is provided from the DC-DC converter to the LNB element via the interfacility link.

14. The adaptor card of claim 13, wherein the interfacility link is a COAX L-Band interface.

15. The adaptor card of claim 12, wherein the DC-DC converter is connected to the tuner and supplies power to the tuner.

16. The adaptor card of claim 1, wherein the adaptor card fits in a card slot within a casing of the personal computer.

17. The adaptor card of claim 1, further comprising a microprocessor for controlling the operation of the tuner and the demodulator.

18. The adaptor card of claim 1, wherein the DC-DC converter comprises a plurality of voltage regulator elements including:

a first voltage regulator element, for converting the voltage signal into a first voltage signal providing power of a first voltage; and a second voltage regulator element, for converting the voltage signal into a second voltage signal providing power of a second voltage.

19. The adaptor card of claim 18, wherein the first voltage is different from the second voltage.

20. The adaptor card of claim 1, wherein the DC-DC converter supplies power through the tuner to a LNB element.

21. A method for controlling an adaptor card for use in a personal computer, for enabling the personal computer to receive a signal from a satellite communication network, comprising the steps of:

receiving, by the adaptor card, a plurality of signals from the satellite communication network;

selecting, by the adaptor card, a signal from among the plurality of signals for reception;

converting, by the adaptor card, the signal into a digital data stream;

transmitting, by the adaptor card, the digital data stream, status information from a tuner of the adaptor card, and status information from a demodulator of the adaptor card to the personal computer via a bus interface; and receiving a dc voltage signal from a power supply of the personal computer and converting the dc voltage signal into a plurality of dc voltage signals for providing power to the tuner.

22. The method of claim 21, further comprising the step of receiving, by the adaptor card, commands to the tuner and to the demodulator via the bus interface for controlling operation of the tuner and the demodulator in accordance with the status information of the tuner and the demodulator.

23. The method of claim 22, further comprising the steps of: sweeping through a given bandwidth steps of a smaller bandwidth;

calculating at each step a signal quality factor for the received signal;

determining if the signal quality factor for the received signal is more desirable than previously calculated signal quality factors; and saving the signal quality factor if it is more desirable.

24. The method of claim 21, further comprising the step of performing forward error correction, by at least one forward error correction element in the adaptor card, on the digital data stream.

25. The method of claim 21, further comprising the step of performing frame detection on the digital data stream.

26. The method of claim 25, wherein the step of performing frame detection further comprises the step of frame error detection.

27. The method of claim 21, further comprising the step of performing address filter to receive only signals addressed to one of a predetermined set of addresses.

28. The method of claim 21, further comprising the step of decrypting the digital data stream of the selected signal.

29. The method of claim 21, wherein the step of converting the voltage signal comprises:

converting the voltage signal, by a first voltage regulator element, into a first voltage signal providing power of a first voltage to the tuner; and converting the voltage signal, by a second voltage regulator element, into a second voltage signal providing power of a second voltage to the tuner.

30. The method of claim 29, wherein the first voltage is different from the second voltage.

31. The method of claim 21, further comprising the step of supplying power through the tuner to a LNB element.

* * * * *

UNITED STATES PATENT AND TRADEMARK OFFICE
CERTIFICATE OF CORRECTION

PATENT NO. : 5,699,384

DATED      : December 16, 1997

INVENTOR(S) : Douglas M. DILLON

It is certified that error appears in the above-identified patent and that said Letters Patent is hereby corrected as shown below:

ON THE COVER PAGE:

AT [56] References Cited - U.S. Patent Documents:

--5,347,304    9/1994    Moura et al.    348/12-- should be inserted.

Signed and Sealed this

Seventh Day of November, 2000

Attest:

Q. TODD DICKINSON

Attesting Officer    Director of Patents and Trademarks